United States Patent
Healey et al.

(10) Patent No.: US 7,794,640 B2
(45) Date of Patent: Sep. 14, 2010

(54) PROCESS OF DRAPING A NON-CRIMP FABRIC OVER A FORMING TOOL

(75) Inventors: Michael J Healey, Meudon-la-Floret (FR); Raymond Johnsen, Langevaag (NO)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/320,063

(22) Filed: Jan. 15, 2009

(65) Prior Publication Data

US 2009/0194906 A1  Aug. 6, 2009

Related U.S. Application Data

(63) Continuation of application No. 10/466,673, filed as application No. PCT/GB01/05673 on Dec. 20, 2001, now abandoned.

(30) Foreign Application Priority Data

Jan. 19, 2001   (GB)   ................... 0101362.2

(51) Int. Cl.
*B29C 70/30* (2006.01)
*B29C 70/34* (2006.01)

(52) U.S. Cl. .................. 264/258; 112/475.01; 264/324

(58) Field of Classification Search ................ 264/258, 264/324; 112/475.01
See application file for complete search history.

(56) References Cited

U.S. PATENT DOCUMENTS

| | | | |
|---|---|---|---|
| 4,410,577 A * | 10/1983 | Palmer et al. ................. 428/85 |
| 4,550,045 A | 10/1985 | Hutson | |
| 4,623,574 A * | 11/1986 | Harpell et al. .............. 428/113 |
| 4,834,439 A * | 5/1989 | van de Kamp ................ 294/74 |
| 4,857,379 A | 8/1989 | Plontges et al. | |
| 4,872,323 A * | 10/1989 | Wunner ...................... 66/84 A |
| 5,436,064 A | 7/1995 | Schnegg et al. | |
| 5,512,348 A | 4/1996 | Mazelsky | |
| 5,795,835 A * | 8/1998 | Bruner et al. ............... 442/310 |
| 5,809,805 A * | 9/1998 | Palmer et al. ............... 66/84 A |
| 2004/0041128 A1 * | 3/2004 | Carter et al. ................ 252/500 |
| 2004/0219855 A1 * | 11/2004 | Tsotsis ....................... 442/364 |

FOREIGN PATENT DOCUMENTS

DE  199 13 647 A1   9/2000
EP  0 226 345   6/1987

(Continued)

OTHER PUBLICATIONS (David R. Lide, ed., CRC Handbook of Chemistry and Physics, Internet Version 2005, http://www.hbcnetbase.com, CRC Press, Boca Raton, FL 2005).*

*Primary Examiner*—Leo B Tentoni
(74) *Attorney, Agent, or Firm*—Nixon & Vanderhye P.C.

(57) ABSTRACT

A method of producing a non-crimp fabric and a non-crimp fabric comprising a layup of fabric plies stitched together by a thread, at least part of which is fusible, is provided. The method can include heating the stitched plies to soften or melt the fusible thread. The use of fusible thread can act as an in situ binder within the non-crimp fabric and tension created by the unfused stitching may create channels for matrix resin infusion during manufacture.

27 Claims, 1 Drawing Sheet

FOREIGN PATENT DOCUMENTS

| | | |
|---|---|---|
| EP | 0 361 796 A2 | 4/1990 |
| EP | 0 383 953 A1 | 8/1990 |
| EP | 0 826 488 A2 | 3/1998 |
| FR | 2 568 275 | 1/1986 |
| FR | 2 594 858 | 8/1987 |
| GB | 2 102 036 A | 1/1983 |
| GB | 2 269 829 A | 2/1994 |
| WO | 92/08604 | 5/1992 |
| WO | 98/10128 | 3/1998 |

\* cited by examiner

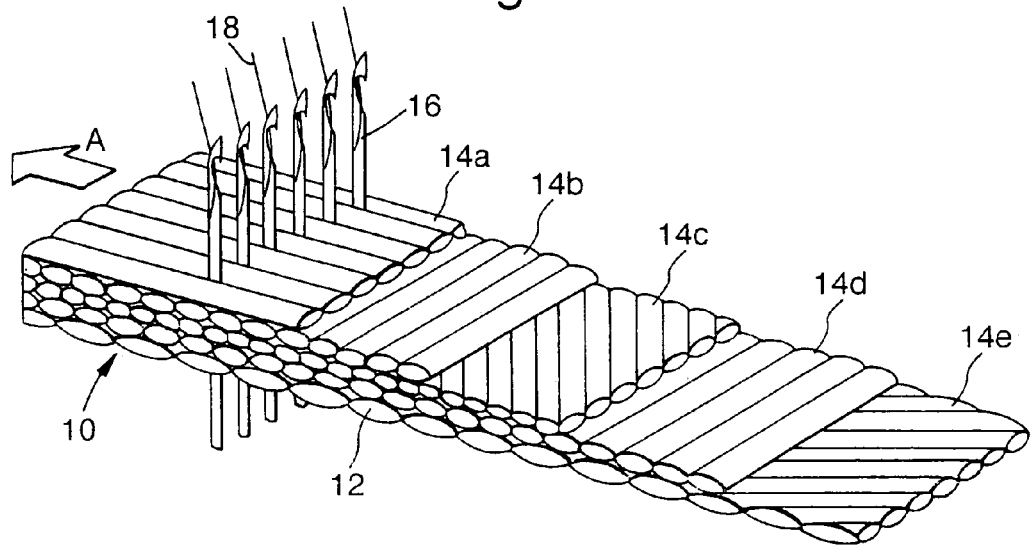

PROCESS OF DRAPING A NON-CRIMP FABRIC OVER A FORMING TOOL

This application is Continuation of application Ser. No. 10/466,673, filed Jul. 28, 2003 (now abandoned) which was a U.S. national phase of International Application PCT/GB01/05673, filed 20 Dec. 2001, which designated the U.S. and claims priority to GB application 0101362.2 filed 19 Jan. 2001. The entire contents of these applications are incorporated herein by reference.

The invention relates to non-crimp fabrics and is particularly concerned with non-crimp fabrics with improved drape characteristics.

It is known to produce fabrics, by laying several plies of fibres into a stack of required thickness. The fabrics may be of a non-crimped or warp-knitted type. The fabrics maybe unidirectional (fibres in a single orientation) or more typically multi-axial. The term "Multi-axial" means that alternate plies of fibres will be constructed in several different directions to produce a fabric with optimum strength and stiffness in required directions. Commonly used directions are 0°, +45°, −45° and 90°. Normally the 0° plies are in the warp direction and the 90° plies in the weft direction, but other layers may contain fibres at different angles, typically at 45° or −45°. The term "Non-crimp" refers to fabrics where one or multiple layers of fibres are laid upon each other and transformed into a fabric by stitching or application of a binder such that the fibres remain straight and without substantial crimp. As well as offering performance advantages relative to traditional woven materials, non-crimp fabrics (NCFs) may be cheaper to produce per unit mass and be faster to manufacture. Such composites have potential for use in the production of wing skins for example.

However, as the number of layers in a non-crimped fabric blanket increases, the ability to conform to changes in shape of the component being made (drape) decreases due to the restrictions imposed by the stitching. Consequently, the drape characteristics of unidirectional and biaxial NCFs are generally comparable to that of woven fabrics whereas drape is increasingly restricted with triaxials, quadraxials, etc. hence restricting possible applications.

The present application is concerned with non-crimp fabrics having improved drape properties.

The prime role of the stitching is to hold the plies of the non-crimp fabric together during handling in a predominantly un-crimped manner. However, if the density of stitches is too high or the stitching is under too much tension or too thick then disruption and crimping of the fibres may occur.

It is also known to use a binder powder for pre-form manufacture using non-crimp fabrics. However, the use of such fine powders may be hazardous as the powder may inhaled or irritate the skin of an operative.

According to the invention there is provided a method of producing a non-crimp fabric which comprises providing a laminate of plies and stitching the plies together using a fusible thread.

In use, the primary function of the stitch is to hold the fibres together during the non-crimp fabric manufacture and to aid resin infusion. Whilst the stitch initially restricts drape, the eventual fusion of the stitch overcomes that restriction. In the present application, the term fusible means that the thread not only melts by itself when heated, but may also dissolve into a resin during processing at temperature. Therefore, by using a fusible thread, the stitched plies can be heated so as to soften or melt the fusible thread so as to improve the drape of the fabric.

Preferably, the plies are warp and weft dominated. Examples of warp and weft dominated plies are described in EP-A-0826488 to which the reader is directed for details. Fibres of each ply used in the composite may be constructed in several different directions. In the present application they are preferably 0°, +45°, −45° and 90°, but angles of ±20° to 90° can be used on the weft orientation.

The non-crimp fabric may comprise from 0.5% to 10% fusible thread by mass. More preferably, the non-crimp fabric comprises from 1% to 3% fusible thread by mass.

The fusible thread will preferably melt at a temperature of between 40° C. to 150° C., depending on application and processing route used. The fused thread may react with the curing resin or remain as a separate phase, preferably causing minimal decrease in mechanical properties and improving damage tolerance. Preferably, after curing, the fusible thread should have a glass transition temperature ($T_g$) of greater than 120° C. for aerospace applications. To balance the melting and $T_g$ temperature, some reaction between the fused stitch and resin is desirable. A $T_g$ greater than 120° C. would improve hot-wet performance, especially in compression. A $T_g$ of less than 120° C. may help damage tolerance.

The fusible thread may be constructed from one or more different materials. Where a plurality of materials is used, the threads may fuse at different temperatures or contain both fusible and infusible materials. If one material is infusible, the fibres are preferably not continuous, thus allowing movement when the fusible material melts. Infusible thread materials at normal processing temperatures include: polyester, acrylamide polymers, e.g. Kevlar®, carbon, acrylonitrile polymers e.g. Panox®, or PBO. Fusible thread materials may include polyamides, lower molecular weight polymers of polyethersulphone e.g. Grillon K-110 from EMS Chemie AG or blends of epoxy resins.

The fusible thread may be constructed from two or more different materials, each having a different fusion temperature.

Preferably, the stitching runs substantially transversely through the plies and follows a predetermined pattern. The pattern may be tricot closed, open pillar stitch, closed pillar stitch, open tricot-pillar stitch, or closed tricot-pillar stitch or variants thereof.

The method may also include heating the plies as aforesaid to improve the drape of the fabric. In one embodiment, the plies are heated to a temperature not greater than the fusion temperature of the thread. However, in another embodiment, the plies are heated to a temperature at or above the fusion temperature of the fusible thread, so that the thread fuses and allows the fabric to move. Where this occurs without the presence of a matrix resin, cooling under pressure below the fusion temperature substantially maintains the shape formed creating a pre-form, due to the fusible stitch acting as an in-situ binder.

Tension in the un-fused stitching tends to create channels in the non-crimp fabric which are normally undesirable. However, it has been found that the method may facilitate easier matrix resin infusion into the fabric through the channels, and then heating the fabric to a temperature above the fusion temperature of the stitching whereby the stitching fuses and relieves the tension. In that way fibres in the non-crimp fabric, which have been crimped due to tension in the stitching, will move to minimise crimp, reduce resin rich areas and improve ultrasonic NDT inspection.

Where the method includes infusing the non-crimp fabric with a matrix resin, the fusible thread will preferably be chemically compatible with the matrix resin and be of a similar modulus.

The fusible thread may melt and remain as a separate phase from the matrix resin, dissolve in the matrix or precipitate out later as the matrix is cured or allowed to set.

The matrix may be a resin.

The fused stitching may also act as a toughening phase within resin infused non-crimp fabric. Such a secondary benefit would be normally at fusible stitch levels of 5-10% of fabric mass A hairy yarn as disclosed in applicant's U.S. Pat. No. 7,456,119 and entitled 'Composites' may be introduced into the plies so as to improve the shear properties between the plies and improve damage tolerance.

A non-crimp fabric in accordance with the invention will now be described by way of example and with reference to the accompanying drawings in which:

FIG. 1 is a schematic cutaway view of a non-crimp fabric being stitched with a fusible thread; and FIG. 2 is a table showing different types of stitch patterns.

Referring to FIG. 1, a non-crimp fabric 10 is constructed from a laminate 12 of plies 14a-14e. The plies are multi-axial with fibres in respective plies 14a to 14e at angles of 0°, 90°, +45°, 90° and −45° as shown in FIG. 1.

A set of needles 16 is used to facilitate the stitching of the plies 12 together. The needles 16 move transversely up and down through the laminate 12 in a predetermined pattern whilst the laminate is moved in a direction shown by the arrow 'A'. Examples of predetermined stitch patterns used can be seen in FIG. 2.

A fusible thread 18, for example made of Grillon K-110®, is threaded into the needles 16. The thread 18 is then stitched into the laminate 12 in the predetermined pattern.

The non-crimp fabric 10 can then be used to produce structural components. The fabric 10 is draped over a pre-form tool to be copied (not shown), with the fabric being cut to shape first. The fabric 10 may be heated to a temperature at or in excess of the fusion temperature of the thread so as to relieve some of the tension within the thread thereby improving the drape of the fabric.

In another embodiment of the invention, a resin (not shown) is infused in to the non-crimped fabric 10. During the infusion process the resin passes through channels (not shown) resulting from tension in the stitching. After infusion, the fabric 10 is heated to a temperature above the fusion temperature of the thread. This causes the stitching to fuse and thereby relieve the tension. As a result, fibres in the non-crimp fabric 10, which have been crimped due to tension in the stitching, can move to minimise crimp.

In still another embodiment of the invention a 'hairy yarn' (not shown) may be used. Strands of hairy yarn are substituted for fibres within the plies 14. The strands of hairy yarn in one ply interact with those in another thereby improving the shear strength properties of the non-crimp fabric 10 as described in the aforementioned U.S. Pat. No. 7,454,119 to which the reader is directed for full details.

The invention claimed is:

1. A method of draping a non-crimp fabric over a forming tool prior to resin impregnation and prior to curing of said non-crimp fabric, the method including the steps of:
    providing a non crimp fabric comprising a layup of plies stitched together using a thread at least part of which is fusible at a temperature that is lower than a curing temperature of said resin;
    placing the non crimp fabric on the forming tool; and
    heating the non crimp fabric sufficiently to soften the fusible thread as the non crimp fabric drapes over the tool, thereby reducing the restriction to drape caused by the stitching.

2. A method according to claim 1 in which the plies are heated to a temperature not greater than the fusion temperature of the thread.

3. A method according to claim 1 in which the plies are heated to a temperature above the fusion temperature of the thread.

4. A method according to claim 3 in which pressure is applied to conform the plies to the shape of the tool and the plies are cooled, while under pressure, thereby creating a pre-form with the fused thread acting as an in situ binder within the non-crimp fabric.

5. A method according to claim 1 including creating tension in the un-fused stitching to create resin transfer channels in the non-crimp fabric.

6. A method according to claim 1 in which matrix resin is infused through the non-crimp fabric.

7. A method according to claim 5 including selecting a matrix resin which is chemically compatible with the fusible thread.

8. A method according to claim 5 including selecting a matrix resin and a fusible thread, said matrix resin when cured and said fusible thread both having a similar modulus of elasticity.

9. A method according to claim 5 in which the fusible thread remains as a separate phase from the matrix resin, dissolves in the matrix resin or precipitates out as the matrix resin is cured or allowed to set.

10. A method according to claim 5 in which the stitching is selected so that the fused stitching acts as a toughening phase within the resin infused non-crimp fabric.

11. A method according to claim 1 in which the non-crimp fabric provided comprises from 0.5% to 10% fusible thread by mass.

12. A method according to claim 11 in which the non-crimp fabric provided comprises from 1% to 3% fusible thread by mass.

13. A method according to claim 1 including melting or dissolving the fusible thread at a temperature between 40° C. and 250° C.

14. A method according to claim 1 including selecting a fusible thread with a glass transition temperature ($T_g$) of greater than 120° C. after curing.

15. A method according to claim 1 in which the fusible thread is constructed from two or more parts comprising different materials, each having a different fusion temperature.

16. A method according to claim 15 in which at least one of the materials from which the thread is constructed is infusible.

17. A method according to claim 16 in which the said infusible part of the thread is non-continuous.

18. A method according to claim 16 in which the said infusible part of the thread is of polyester.

19. A method according to claim 1 in which the stitching is run substantially transversely through the plies.

20. A method according to claim 19 in which the stitching is carried out in a predetermined pattern and is selected from the group consisting of: tricot closed, open pillar stitch, closed pillar stitch, open tricot-pillar stitch or closed tricot-pillar stitch.

21. A method according to claim 1 including providing a said non crimp fabric in which the plies are multi-axial.

22. A method according to claim 1 in which fibres of each ply are placed in directions of 0°, +45°, −45° and 90°.

23. A method according to claim 1 in which fibres of each ply are placed in directions of ±20° to 90°.

24. A method according to claim 1 in which a hairy yarn is introduced into the plies.

25. A method of draping a non-crimp fabric over a forming tool prior to resin impregnation and prior to curing of said non-crimp fabric, the method including the steps of:
providing a non crimp fabric comprising a layup of plies stitched together using a thread at least part of which is fusible;
placing the non crimp fabric on the forming tool;
heating the non crimp fabric sufficiently to soften the fusible thread as the non crimp fabric drapes over the tool, thereby reducing the restriction to drape caused by the stitching; and
infusing matrix resin through the non-crimp fabric.

26. A method of draping a non-crimp fabric over a forming tool according to claim 25, wherein, prior to said infusing step and after said heating step, the non-crimp fabric is cooled, removed from said forming tool and placed in a mold tool.

27. A method of creating a pre-form by draping a non-crimp fabric over a forming tool prior to resin impregnation and prior to curing of said non-crimp fabric, the method including the steps of:
providing a non crimp fabric comprising a layup of plies stitched together using a thread at least part of which is fusible;
placing the non crimp fabric on the forming tool;
heating the non crimp fabric sufficiently to soften the fusible thread as the non crimp fabric drapes over the forming tool, thereby reducing the restriction to drape caused by the stitching;
using pressure applied to the non-crimp fabric to conform the plies to the shape of the forming tool;
cooling the non-crimp fabric to a temperature below the fusible temperature of said thread; and
removing the pre-form from the forming tool.

* * * * *